Dec. 13, 1966  B. MESCO  3,291,391

THERMALLY CONTROLLED SHUT-OFF VALVE FOR SHOWER HEADS

Filed Dec. 17, 1964

INVENTOR.
BERNARD MESCO
BY
Elliott & Pastoriza
ATTORNEYS

United States Patent Office 3,291,391
Patented Dec. 13, 1966

3,291,391
THERMALLY CONTROLLED SHUT-OFF VALVE FOR SHOWER HEADS
Bernard Mesco, 3903 S. Orange Drive, Los Angeles, Calif.
Filed Dec. 17, 1964, Ser. No. 418,975
4 Claims. (Cl. 236—93)

This invention relates generally to water flow control valves and more particularly to an improved thermally responsive valve particularly suitable for use with shower heads for automatically shutting off the major flow of water if it exceeds a predetermined temperature.

Control valves for shutting off water when it exceeds a predetermined temperature have been known heretofore. Many of these valves incorporate electrical control circuit means which renders them not only expensive but difficult to install and maintain.

In other instances, purely mechanical type valves employing thermally responsive elements have been proposed. However, the types of valve components used such as shutter structures and the like may stick in one position or the other and thus become inoperative. Since water of varying temperatures is constantly flowing through the valve except at the point where the valve is shut off in response to the water temperature exceeding a predetermined temperature, the parts making up the valve structure must necessarily be rugged, corrosion-proof, and designed in such a manner as to operate reliably at all times.

Further, it is desirable that a thermally responsive valve device be capable of installation with conventional shower fixtures without necessitating any modification of presently used structures.

With all of the foregoing in mind, it is accordingly a primary object of this invention to provide an improved thermally responsive shut-off valve suitable for use with shower heads which will automatically shut off the major flow of water should its temperature exceed a predetermined value.

More particularly, objects of this invention are to provide a thermally responsive shut-off valve which does not require any electrical controls or the like, is very ruggedly and reliably designed with a minimum number of parts, and which includes unique valving principles which render the device of high reliability and long life.

Briefly, these and other objects and advantages of this invention are attained by providing a housing adapted to be coupled between a conventional shower outlet pipe and the shower head itself. Towards this end, the housing includes standard threads at each end to effect the coupling. Within the housing there is provided a partition having at least one major opening through which water passing to the shower head from the outlet pipe flows. A ball or balls in turn are arranged to be moved by a suitable rotatably mounted casing means from a first position in which it is free of the opening in the partition to a second position in which it rolls over the opening to cover the same. To effect this operation, there is provided a bi-metallic thermally responsive element in coil form having one end secured within the housing and its other end secured to the caging means so that a change in temperature will effect a movement of the caging means. The arrangement is such that when the temperature of the water flowing past the bi-metallic coils in the housing exceeds a predetermined value, the bi-metallic coil will be distorted to the extent that the caging means will position the ball in its second position to cover the opening in the partition and thereby automatically cut off the flow of the hot water.

The partition preferably also includes a smaller bleed opening which remains open at all times to permit a trickle of water to pass through so that when the cold water is turned on the hot water is displaced and the bi-metallic coil will return to its initial shape thereby removing the ball from the major opening.

A better understanding of the invention as well as further important features and advantages thereof will be had by now referring to the preferred embodiment thereof as illustrated in the accompanying drawings, in which.

Figure 1:
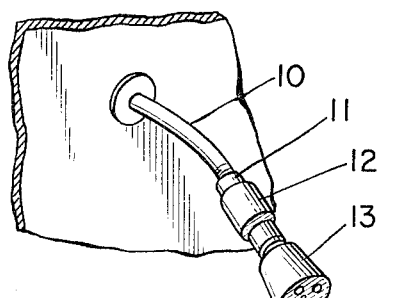
FIGURE 1 is a fragmentary perspective view of a shower structure incorporating the thermally controlled shut-off valve of this invention.

Referring first to FIGURE 1, there is shown a shower head outlet pipe 10, connected to a coupling 11 forming part of a housing 12 for the thermally responsive shut-off valve of this invention. The conventional shower head 13, normally connected to the outlet pipe 10, is shown connected to the other end of the housing 12.

The coupling 11 and housing 12 for the valve structure are normally provided with standard threads so that the shower head 13 may be coupled directly to one end of the housing and the housing coupling 11 threaded directly to the outlet pipe 10.

Figure 2:
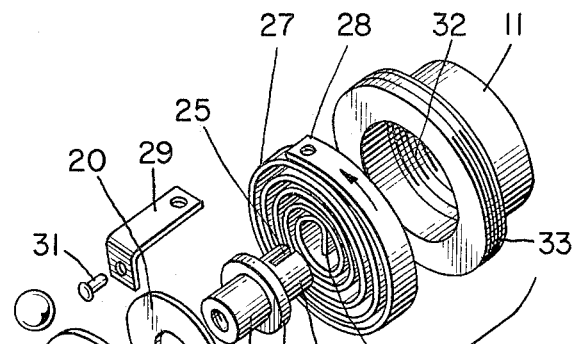
FIGURE 2 is an enlarged cut-away perspective exploded view of the various components making up the thermally responsive shut-off valve illustrated in FIGURE 1.
Figure 2:
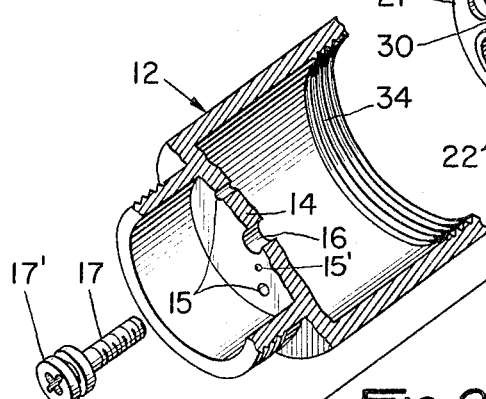

Referring now to FIGURE 2, the housing 12 and incorporated valve components are shown in exploded relationship. The housing 12 includes a transverse partition 14 having at least one and preferably three off-center openings 15 passing therethrough. Also provided is a small bleed opening 15' disposed radially inwardly of the opening 15 and of much smaller diameter than the openings 15. The partition 14 has a central bore 16 for receiving a mounting screw 17. Mounting screw 17 serves to support a body member 18 so that the body member 18 extends from the rear surface of the partition 14 when the device is assembled. The body member 18 is shown in the central portion of the exploded view and includes an annular flange 19.

The front portion of the body member 18 preceding the flange 19 constitutes a shaft or journalling surface for receiving a caging disc 20 and caging disc structure 21. The caging disc structure 21 is provided with enlarged openings 22 as shown for receiving balls 23. The openings 22 are of a diameter larger than the given diameter of the holes 15 in the partition 14 but of lesser diameter than the various balls 23.

The rear portion of the body member 24 following the flange 19 includes a diametrical slot 25 for securing one end 26 of a bi-metallic thermally responsive coiled strip structure 27. The other end of this coiled bi-metallic strip is shown at 28 and is arranged to be secured to a bracket 29. The bracket 29 in turn is connected to the caging disc 21 at the opening 30 as by a small rivet 31.

The assembly is completed by the rear coupling 11 having internal threads 32 for coupling to the pipe 10 of FIGURE 1 and external threads 33 for mating with internal threads 34 in the housing 12.

Figure 3:
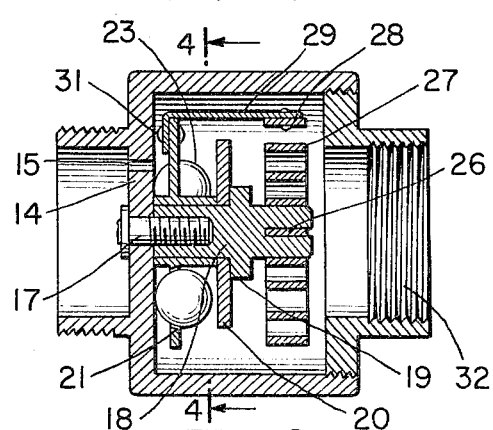
FIGURE 3 is a cross-section of the various components in assembled relationship with the valve in its first or open position to permit flow of water therethrough.

Referring now to FIGURE 3, the various components described in FIGURE 2 are shown in assembled relationship wherein it will be noted that the screw 17 supports the body 18 against the rear surface of the partition 14, the body flange 19, in turn, serving as a backing for the caging disc 20. The manner in which the screw 17 is threaded into the body member 18 will determine the orientation of the diametrical slot 26 securing one end of the bi-metallic strip coil 27. In this respect, the screw 17 serves as an adjustment to tighten or loosen the bi-metallic coil 27 and thus position through the bracket 29 as described the caging disc 21 such that the various balls supported between the openings in the caging disc and the rear disc 20 assume a position free of the holes 15 when the temperature of the bi-metallic coil strip is below a predetermined value. This first position is illustrated in FIGURE 3 and when properly adjusted, the end of the screw 17 such as the portion of the head 17', illustrated in FIGURE 2, may be broken off so that tampering with the screw is not possible.

Figure 4:
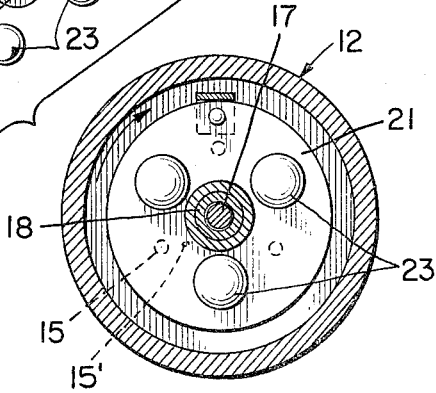
FIGURE 4 is a cross-section taken in the direction of the arrows 4—4 of FIGURE 3.

FIGURE 4 shows in cross-section the arrangement of the three balls 23 in their first positions free of the openings 15 so that water may flow through the housing. Then the temperature of the water exceeds a predetermined value, the caging structure and balls will be rotated in the direction of the arrow of FIGURE 4 to their second positions to cover the holes 15 and shut off the flow of water.

Figure 5:
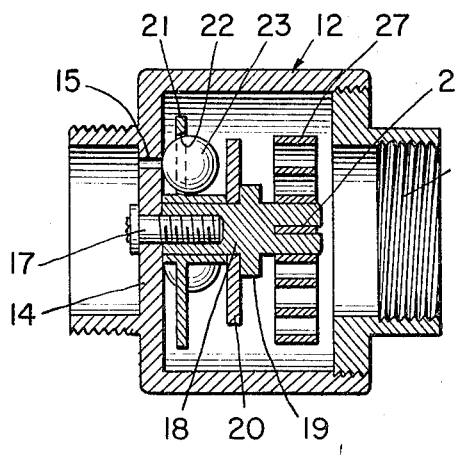
FIGURE 5 is another cross-section similar to FIGURE 3 but illustrating the relative positions of certain components when the valve is in its second or closed position to cut off the major flow of water therethrough.

FIGURE 5 illustrates the balls 23 in their second positions, and it will be evident that they will be held over the holes 15 by water pressure since water is blocked from passing from the inlet of the housing 12 through the holes to the outlet except for a small trickle of water which passes through the bleed hole 15'. The balls 23 are positioned between the caging structure 21 and caging disc 20. By this arrangement, a peripheral portion of the balls extends through the openings 22 to engage the rear surface of the partition 14 with the peripheral edges of the openings 22 engaging the balls at points between their centers and the partition. As a consequence, when the caging disc 21 is rotated, the peripheral edge of the opening 22 will engage the balls at points between their centers and the partition and thereby result in a lifting of the balls 23 away from the openings 15. This action thus breaks the small pressure differential across the balls and permits them to easily roll back to their first positions when the bi-metallic coil cools.

By employing balls for covering small diameter openings as described, a very reliable valve means results which is not subject to becoming stuck or jammed even though water is normally flowing therepast when the valves are in open position.

The overall operation of the shut-off valve will be evident from the foregoing description. As stated, with normal water flowing through the inlet and outlet of the housing structure 12 wherein the temperature of the water is below a predetermined temperature, the balls assume the position illustrated in FIGURES 3 and 4 wherein the holes 15 are uncovered and water may freely flow therethrough to the shower head. If now the temperature of the water increases beyond a predetermined amount, the bi-metallic coil strip 27 will distort in such manner as to rotate the caging disc 21 through the medium of the bracket 29 from its first position to its second position illustrated in FIGURE 5 wherein the various balls now cover the openings 15. The major flow of water will thus be automatically shut off and the user can only reset the valve structure by turning on cold water to force the hot water out through the bleed hole 15' and thereby cool the metallic strip.

From the foregoing description, it will be evident that the present invention has provided a greatly improved automatic thermally responsive shut-off control valve suitable for showers or similar environments. While the invention has been described particularly in conjunction with shower heads, it will be evident that it may be incorporated in any system in which it is desired to shut off a major water flow when the water itself exceeds a predetermined temperature. The invention therefore is not to be thought of as limited to the exact embodiment set forth merely for illustrative purposes.

What is claimed is:

1. A thermally controlled shut-off valve for shower heads comprising, in combination: a cylindrical housing adapted to be inserted between a shower outlet pipe and a shower head normally connected to said outlet pipe, said housing including a central partition having at least one hole therein of given diameter for passing water below a predetermined temperature from said pipe through said housing to said shower head; a ball member adapted to roll on the inside surface of said partition from a first position free of said hole to a second position covering said hole to shut-off water flow therethrough; caging means holding said ball adjacent to said partition normally in said first position; means mounting said caging means for rotation about a given axis passing normally through said partition; and a thermally responsive bi-metallic strip formed into a coil and having one end stationarily secured within said housing and its other end secured to said caging means for rotating said caging means in response to water passing thereover of a temperature exceeding said predetermined temperature to thereby move said ball from said first to said second position.

2. A shut-off valve for shower heads according to claim 1, in which said caging means includes a circular disc having at least one opening therein of larger diameter than said given diameter of said hole and slightly less than the diameter of said ball, said means mounting said caging means including a body member secured to the rear wall of said partition and extending axially rearwardly to define a shaft portion upon which said disc is rotatably mounted, said shaft portion having an annular flange in spaced parallel relationship to said disc; and a rear disc seated on said flange whereby said ball is caged between said opening in said disc and said rear disc, a peripheral portion of said ball extending through said opening in said disc to engage said partition, rotation of said caging means tending to initially lift said ball from said portion by engagement of the peripheral edge of said opening with a portion of said ball surface between its center and said partition whereby rotation of said caging means in a direction to move said ball from said second to said first position upon a decrease in the temperature of water below said predetermined temperature initially lifts said ball from said hole to overcome water pressure tending to hold said ball in its second position.

3. A shut-off valve for shower heads according to claim 2, in which there are provided at least three holes in said partition circumferentially spaced about the center thereof and at least three corresponding balls and caging openings therefor in said caging means for uncovering and covering said holes when moved between first and second positions.

4. A shut-off valve according to claim 3, in which said partition additionally includes a bleed opening of smaller diameter than said holes and spaced radially inwardly of said holes to permit a small trickle of water to pass through said housing when said balls are in their second position.

References Cited by the Examiner

UNITED STATES PATENTS

| | | | |
|---|---|---|---|
| 1,816,541 | 7/1931 | McDougall | 236—59 |
| 1,888,225 | 11/1932 | Hetherington | 236—93 |
| 2,901,186 | 8/1959 | Price et al. | 137—625.28 X |
| 3,179,911 | 4/1965 | Schmitt. | |

ALDEN D. STEWART, *Primary Examiner.*